(12) United States Patent
Li et al.

(10) Patent No.: US 9,683,878 B2
(45) Date of Patent: Jun. 20, 2017

(54) ELECTROMAGNETIC FLOWMETER

(71) Applicant: Yokogawa Electric Corporation, Musashino-shi, Tokyo (JP)

(72) Inventors: Wandong Li, Musashino (JP); Ikuhiko Ishikawa, Musashino (JP); Yuichi Kaneko, Musashino (JP); Masakazu Saito, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 15/060,731

(22) Filed: Mar. 4, 2016

(65) Prior Publication Data

US 2016/0258793 A1    Sep. 8, 2016

(30) Foreign Application Priority Data

Mar. 5, 2015  (JP) ................. 2015-043039
Oct. 21, 2015 (JP) ................. 2015-207289

(51) Int. Cl.
*G01F 1/58*   (2006.01)
*G01F 1/60*   (2006.01)

(52) U.S. Cl.
CPC ........... *G01F 1/58* (2013.01); *G01F 1/588* (2013.01); *G01F 1/60* (2013.01)

(58) Field of Classification Search
CPC ............... G01F 1/56; G01F 1/58; G01F 1/00
USPC ................... 73/861.08, 861.11; 702/45
See application file for complete search history.

(56) References Cited

U.S. PATENT DOCUMENTS

| | | | | |
|---|---|---|---|---|
| 4,409,846 A | * | 10/1983 | Ueno | G01F 1/58 73/861.12 |
| 4,651,286 A | * | 3/1987 | Fukai | G01F 1/60 702/45 |
| 4,663,976 A | * | 5/1987 | Suzuki | G01F 1/60 361/154 |

(Continued)

FOREIGN PATENT DOCUMENTS

| | | |
|---|---|---|
| JP | H3 144314 A | 6/1991 |
| JP | 11-83572 A | 3/1999 |

(Continued)

OTHER PUBLICATIONS

Communication dated Aug. 19, 2016, issued by the European Patent Office in counterpart European Application No. 16157890.1.

*Primary Examiner* — Jewel V Thompson
(74) *Attorney, Agent, or Firm* — Sughrue Mion, PLLC

(57) ABSTRACT

An electromagnetic flowmeter applies a magnetic field, which is generated by excitation current, to a fluid to be measured flowing in a measurement tube, and measures a flow rate of the fluid to be measured on the basis of a detection signal to be generated from an electrode provided in the measurement tube. The electromagnetic flowmeter includes an excitation circuit configured to generate the excitation current having a positive excitation period, a negative excitation period and a non-excitation period, and a diagnosis unit configured to detect an abnormality based on characteristics of the fluid to be measured, on the basis of a level of the detection signal in a non-excitation stable period, which is a period in which a differential noise of detection signal to be generated in the non-excitation period converges.

14 Claims, 13 Drawing Sheets

(56) References Cited

U.S. PATENT DOCUMENTS

| | | | | |
|---|---|---|---|---|
| 4,969,363 A * | 11/1990 | Mochizuki | ............... | G01F 1/002 324/439 |
| 5,619,110 A * | 4/1997 | Sugimoto | ................. | F16P 3/08 318/450 |
| 6,853,928 B1 * | 2/2005 | Mitsutake | ................. | G01F 1/60 702/45 |
| 7,310,582 B2 * | 12/2007 | Ishikawa | ................... | G01F 1/60 702/45 |
| 2008/0016967 A1 | 1/2008 | Schrag et al. | | |
| 2014/0260662 A1 | 9/2014 | Rogers et al. | | |

FOREIGN PATENT DOCUMENTS

| | | |
|---|---|---|
| JP | 2002-168666 A | 6/2002 |
| JP | 2006-234840 A | 9/2006 |
| JP | 2011209231 A | 10/2011 |
| WO | 2014/082903 A1 | 6/2014 |

* cited by examiner

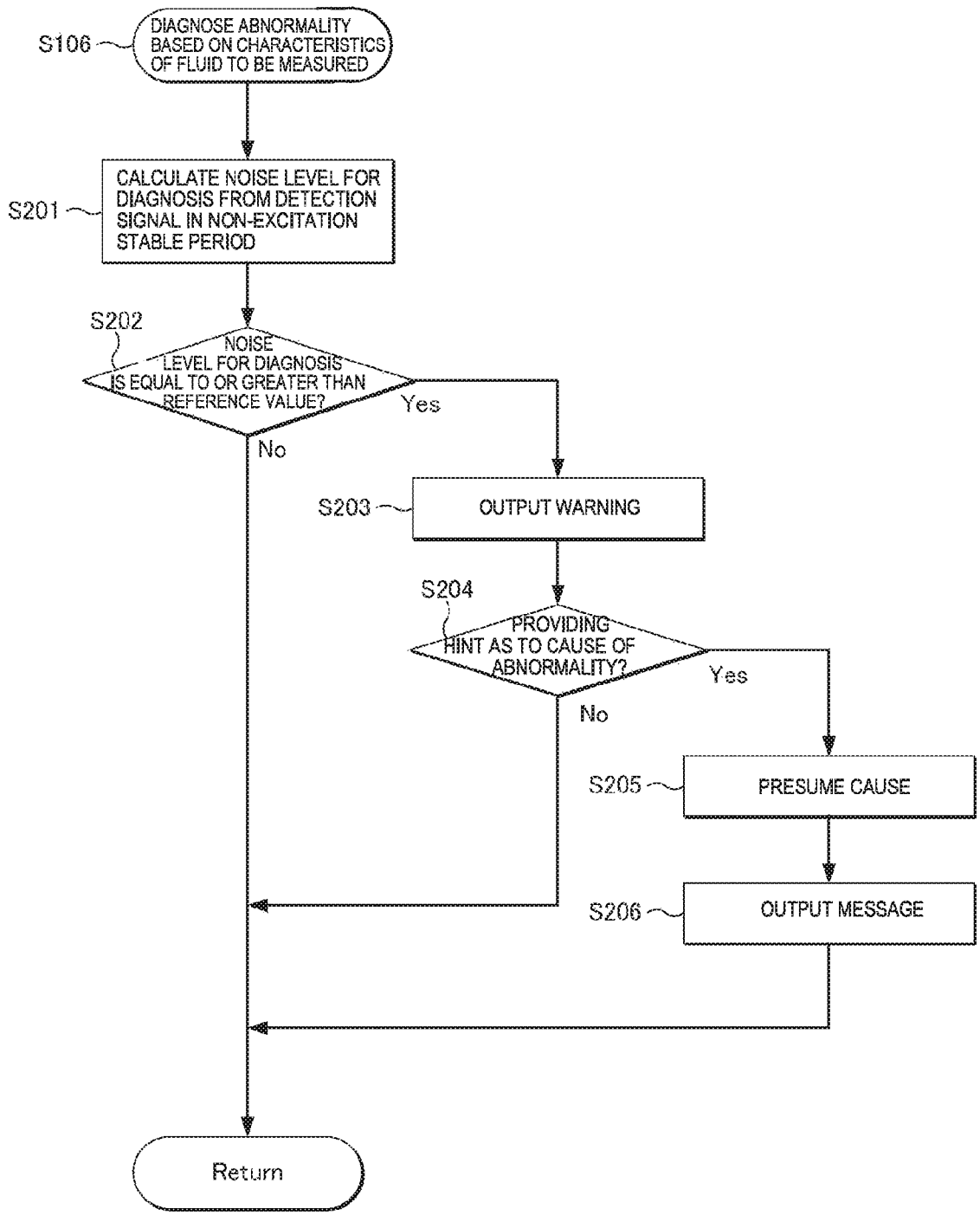

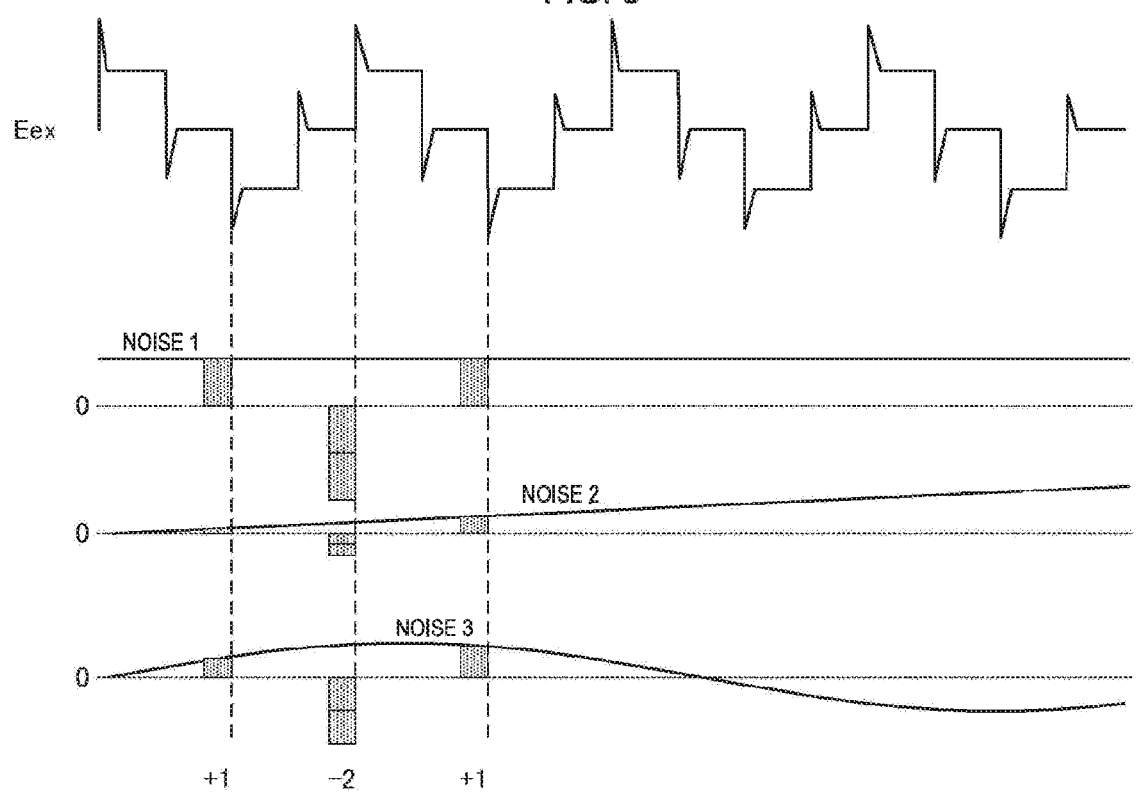

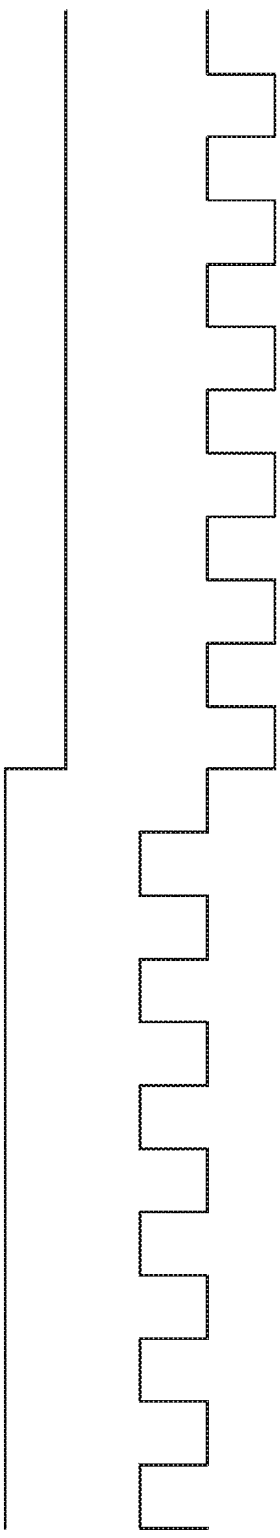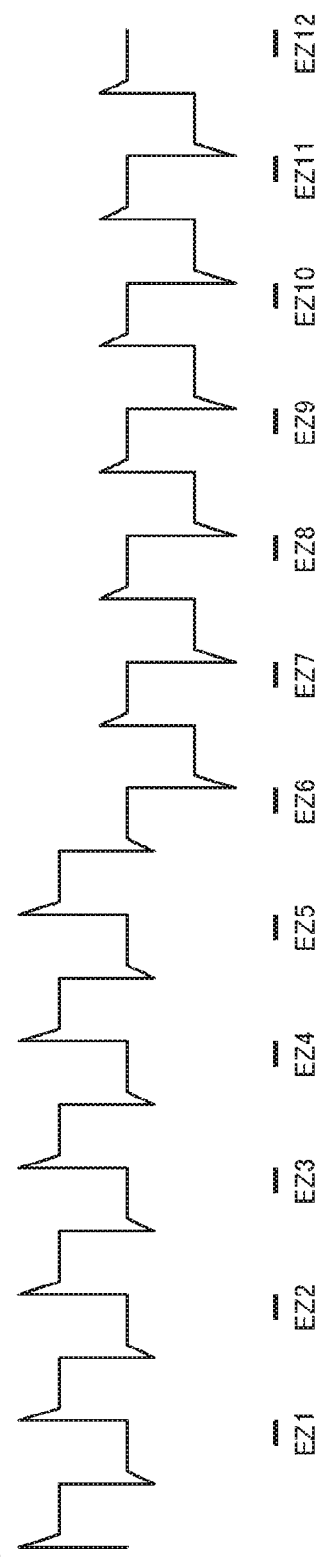

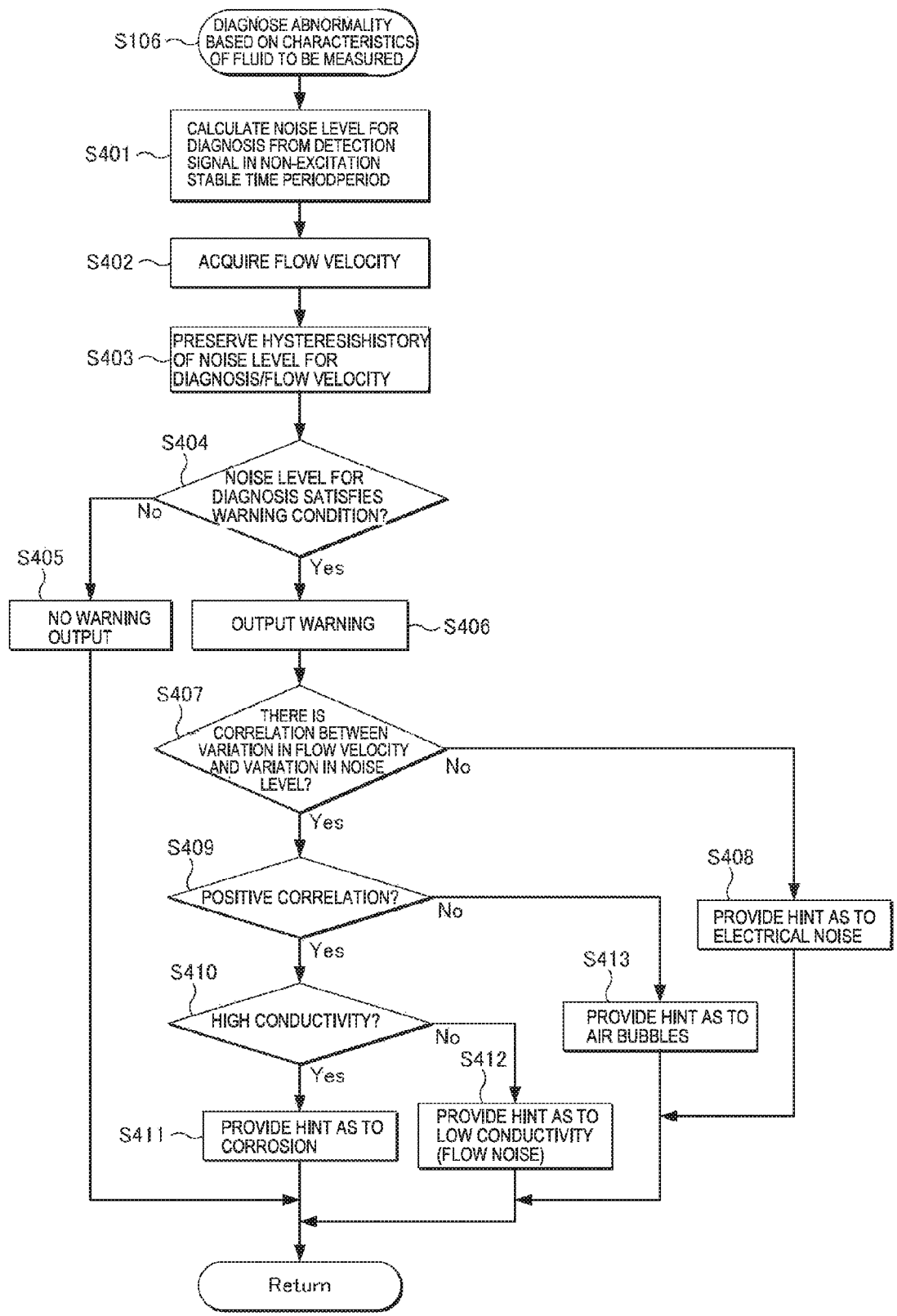

LOW CONDUCTIVITY, CORROSION

AIR BUBBLES

400
ELECTROMAGNETIC FLOWMETER

CROSS-REFERENCE TO RELATED APPLICATION

The present application claims priorities from Japanese Patent Application No. 2015-043039 filed on Mar. 5, 2015 and Japanese Patent Application No. 2015-207289 filed on Oct. 21, 2015, the entire content of which is incorporated herein by reference.

BACKGROUND

Technical Field

The present invention relates to an electromagnetic flowmeter, and particularly, to a technology of detecting an abnormality based on characteristics of a fluid to be measured.

Related Art

Since an electromagnetic flowmeter configured to measure a flow rate of a conductive fluid by using electromagnetic induction is robust and highly precise, it is widely used for industrial utilities. The electromagnetic flowmeter is configured to enable a conductive fluid to be measured to flow into a measurement tube to which a magnetic field is applied in an orthogonal direction, and to measure a generated electromotive force. Since the electromotive force is proportional to a flow velocity of the fluid to be measured, it is possible to obtain a volumetric flow rate of the fluid to be measured on the basis of the measured electromotive force.

The generated electromotive force can be measured by a pair of electrodes (an electrode A503a and an electrode B503b) attached to a measurement tube 501, as shown in FIG. 14, for example. Also, the magnetic field in the orthogonal direction can be generated by enabling excitation current to flow from an excitation circuit 505 to an excitation coil 502 arranged in the vicinity of the measurement tube 501.

In general, as the excitation current Iex, an alternating current of which a positive excitation period and a negative excitation period are switched with each other is used. However, Patent Document 1 discloses a technology of enabling the excitation current Iex of which a non-excitation period is provided between the positive excitation period and the negative excitation period to flow to the excitation coil 502.

Regarding the electromagnetic flowmeter in which the non-excitation period is provided between the positive excitation period and the negative excitation period, Patent Document 2 discloses a configuration where upon switching to the non-excitation period, differential noises generated at the electrode A503a and the electrode B503b are summed and an abnormality, which occurs when the measurement tube 501 is empty or insulating foreign matters are attached to the electrode A503a and the electrode B503b, is detected on the basis of the summed value, as shown in FIG. 15.

According to the technology disclosed in Patent Document 2, since the differential noise is used as an abnormality determination standard, voltages generated at both the electrodes are acquired for a period T1, a period T2, . . . within predetermined time after the switching to the non-excitation period.

[Patent Document 1] Japanese Patent Application Publication No. Hei 3-144314A
[Patent Document 2] Japanese Patent Application Publication No. 2011-209231A The abnormality that occurs in the electromagnetic flowmeter may also occur in other cases as well as when the measurement tube is empty or the insulating foreign matters are attached to the electrodes. For example, an abnormality based on characteristics of the fluid to be measured (process fluid) may occur.

As the abnormality based on characteristics of the fluid to be measured, a case where air bubbles are generated in the fluid to be measured, a case where the fluid to be measured becomes a low conductive fluid, a slurry fluid and the like may be exemplified. Also, a case where an electrode made of a material corresponding to the fluid to be measured is not selected and electrode corrosion due to the acidic/alkali fluid to be measured are also caused due to the abnormality based on characteristics of the fluid to be measured. Also, the attachment of the insulating foreign matters to the electrodes may be included in the abnormality based on characteristics of the fluid to be measured.

It cannot be said that the abnormality based on characteristics of the fluid to be measured always comes to the fore as a magnitude of the differential noise. Therefore, the abnormality determination method using the differential noise, which is disclosed in Patent Document 2, is not appropriate for the abnormality detection based on characteristics of the fluid to be measured. For this reason, it is needed a technology capable of simply detecting the abnormality based on characteristics of the fluid to be measured.

SUMMARY

Exemplary embodiments of the invention provide an electromagnetic flowmeter which simply detects an abnormality based on characteristics of a fluid to be measured.

An electromagnetic flowmeter configured to apply a magnetic field, which is generated by excitation current, to a fluid to be measured flowing in a measurement tube, and to measure a flow rate of the fluid to be measured on the basis of a detection signal to be generated from an electrode provided in the measurement tube, according to an exemplary embodiment of the invention, comprises:

an excitation circuit configured to generate the excitation current having a positive excitation period, a negative excitation period and a non-excitation period; and a diagnosis unit configured to detect an abnormality based on characteristics of the fluid to be measured, on the basis of a level of the detection signal in a non-excitation stable period, which is a period in which a differential noise of detection signal to be generated in the non-excitation period converges.

The diagnosis unit may be configured to set a value, which is to be obtained by averaging absolute values of the detection signals or averaging peak values of the detection signals in continuous non-excitation stable periods, as the level of the detection signal.

The diagnosis unit may be configured to determine that the abnormality based on characteristics of the fluid to be measured has occurred, when the level of the detection signal is equal to or greater than a predetermined reference value.

The diagnosis unit may be configured to provide a hint as to a cause of the abnormality in accordance with a predetermined standard, when it is determined that the abnormality based on characteristics of the fluid to be measured has occurred.

The electromagnetic flowmeter may further comprise:
a conductivity measuring circuit configured to measure a conductivity of the fluid to be measured, wherein the diagnosis unit is configured to provide the hint as to a cause of the abnormality by using the conductivity measured with the conductivity measuring circuit.

The excitation circuit may be configured to generate the excitation current having a two-frequency excitation waveform in which a short-period pulse and a long-period pulse are overlapped.

The diagnosis unit may be configured to set a value, which is to be obtained by calculating a weighted average where a sum of coefficients becomes zero (0) for the detection signals in continuous non-excitation stable periods, as the level of the detection signal.

In the weighted average where a sum of coefficients becomes zero (0), coefficients (1, −2, 1) or (−1, 2, −1) may be used for the detection signals in the three continuous non-excitation stable periods.

The diagnosis unit may be configured to further average the detection signals in a period longer than a period that is to be used for averaging upon calculation of the level of the detection signal and to determine whether the abnormality is constant or sporadic on the basis of a difference of two average values.

The abnormality based on characteristics of the fluid to be measured, which is to be detected by the diagnosis unit, may comprise any one of air bubble generation, a low conductivity, a slurry fluid, electrode corrosion by the fluid to be measured, and attachment of insulating foreign matters to the electrode.

The diagnosis unit may be configured to provide the hint as to the cause of the abnormality by determining a correlation between variation in a flow velocity, which is to be obtained upon measurement of the flow rate of the fluid to be measured, and variation in the level of the detection signal.

The diagnosis unit may be configured to provide a hint indicating that the cause of the abnormality is a low conductivity or electrode corrosion, when it is determined that the correlation between the variation in the flow velocity and the variation in the level of the detection signal is a positive correlation.

The diagnosis unit may be configured to provide a hint indicating that the cause of the abnormality is air bubbles, when it is determined that the correlation between the variation in the flow velocity and the variation in the level of the detection signal is a negative correlation.

The diagnosis unit may be configured to provide a hint indicating that the cause of the abnormality is an electrical noise, when it is determined that there is no correlation between the variation in the flow velocity and the variation in the level of the detection signal.

According to the exemplary embodiment, it is possible to simply detect the abnormality based on characteristics of the fluid to be measured in the electromagnetic flowmeter.

BRIEF DESCRIPTION OF THE DRAWINGS

FIG. 7 is a flowchart depicting abnormality diagnosis processing based on characteristics of a fluid to be measured.

FIG. 8 depicts removal of a noise except for a detection target.

FIGS. 9A to 9D depict a two-frequency excitation waveform and a non-excitation sampling period.

FIG. 11 is a flowchart depicting a second example of the abnormality diagnosis processing.

DETAILED DESCRIPTION

Figure 1:
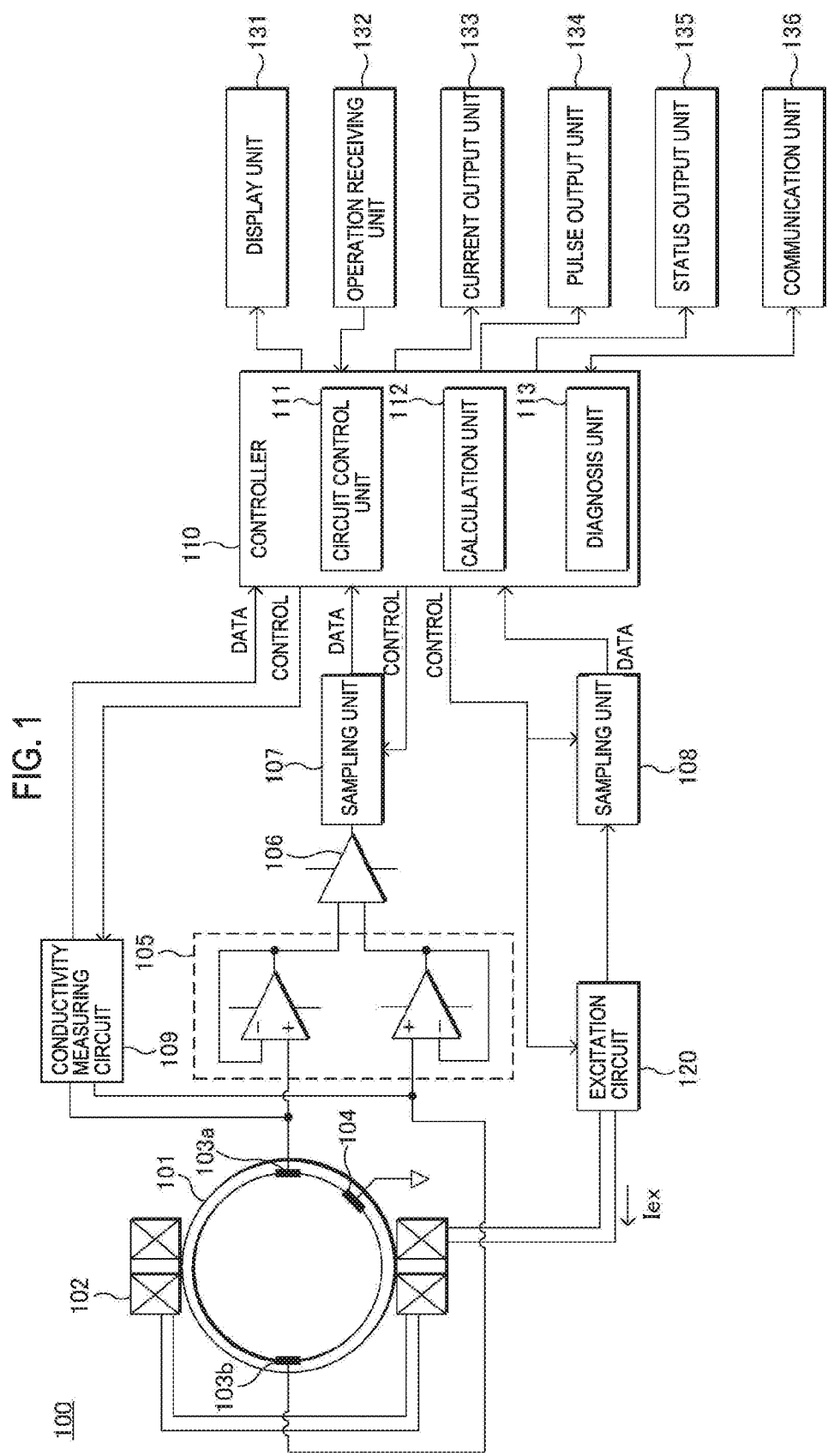
FIG. 1 is a block diagram depicting a basic configuration of an electromagnetic flowmeter according to an exemplary embodiment.

An exemplary embodiment of the present invention will be described with reference to the drawings. FIG. 1 is a block diagram depicting a basic configuration of an electromagnetic flowmeter 100 according to an exemplary embodiment. As shown in FIG. 1, the electromagnetic flowmeter 100 includes a measurement tube 101, an excitation coil 102, an electrode A103a, an electrode B103b, an earth electrode 104, a buffer 105, a differential amplification circuit 106, a sampling unit 107, a sampling unit 108, a conductivity measuring circuit 109, a controller 110, an excitation circuit 120, a display unit 131, an operation receiving unit 132, a current output unit 133, a pulse output unit 134, a status output unit 135, and a communication unit 136.

The controller 110 may be configured by a CPU, a memory and the like, and has a circuit control unit 111, a calculation unit 112 and a diagnosis unit 113.

The circuit control unit 111 is configured to control the sampling unit 107, the sampling unit 108, the excitation circuit 120, the display unit 131, the current output unit 133, the pulse output unit 134, the status output unit 135 and the communication unit 136, and is also configured to receive a variety of instructions from a user through the operation receiving unit 132.

The calculation unit 112 is configured to calculate a flow velocity and a volumetric flow rate of a fluid to be measured flowing through the measurement tube 101, based on an electromotive force measured at the electrode A103a and the electrode B103b. The diagnosis unit 113 is configured to diagnose an abnormality based on characteristics of the fluid to be measured flowing through the measurement tube 101, on the basis of the electromotive force measured at the electrode A103a and the electrode B 103b.

In the electromagnetic flowmeter 100, when the excitation circuit 120 enables excitation current Iex to flow to the excitation coil 102 under control of the controller 110, the electromotive force proportional to the flow velocity of the fluid to be measured is detected at the electrode A103a and the electrode B103b. The detection signal is input to the differential amplification circuit 106 through the buffer 105, so that a foreign noise generated at a common mode is removed and the signal is amplified to have a desired amplification level.

The detection signal that is to be output by the differential amplification circuit 106 is converted into digital data at the sampling unit 107, which is then input to the controller 110. Also, a value corresponding to the excitation current Iex that is output by the excitation circuit 120 is converted into digital data at the sampling unit 108, which is then input to the controller 110.

The conductivity measuring circuit 109 is configured to enable predetermined current to flow to the fluid to be measured through the electrode A103a and the electrode B 103b, and to measure a resistance of the fluid to be measured on the basis of a voltage generated between the electrode A103a and the electrode B103b by the current, thereby measuring a conductivity of the fluid to be measured. The current that is to be used for measurement may be overlapped with the excitation current, for example. In this case, an influence of the current used for the conductivity measurement is excluded from the voltage detected at the electrode A103a and the electrode B 103b.

The display unit 131 may be configured by a liquid crystal display device and the like, and is configured to display a measured value, a diagnosis result and the like. The operation receiving unit 132 may be configured by a plurality of keys, and is configured to receive an operation from the user. The current output unit 133 is configured to scale the measured value, the diagnosis value and the like to a current value within a predetermined range such as 4 to 20 mA and then to output the same. The pulse output unit 134 is configured to scale the measured value, the diagnosis value and the like to a frequency pulse within a predetermined range and then to output the same. The status output unit 135 is configured to output an internal status of the electromagnetic flowmeter 100 to an outside by on and off operations of a contact point. The communication unit 136 is configured to perform communication of various information with an external apparatus through a variety of protocols. In the meantime, the respective output units are just exemplary, and the present invention is not limited thereto.

Figure 2:
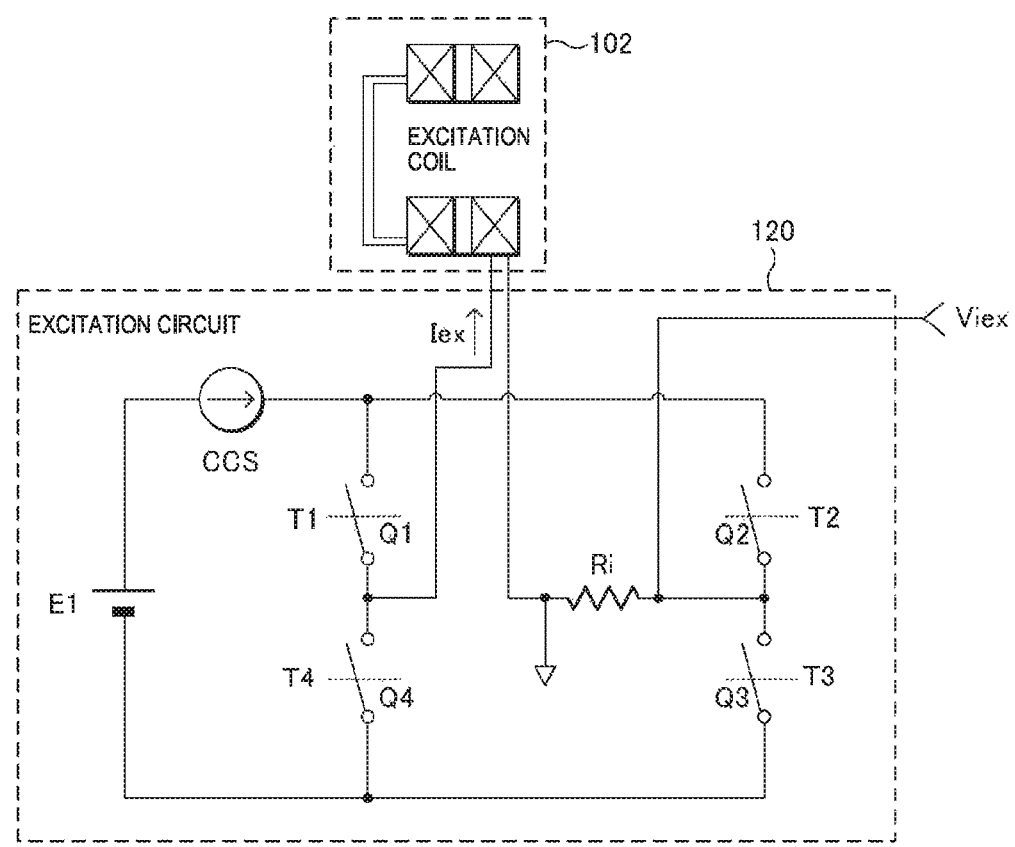
FIG. 2 depicts a specific example of an excitation circuit.

FIG. 2 depicts a configuration example of the excitation circuit 120 configured to enable the excitation current Iex to flow to the excitation coil 102. The excitation circuit 120 has a direct current power supply E1, a constant current source CCS and switching elements Q1, Q2, Q3, Q4. On and off operations of the switching elements Q1, Q2, Q3, Q4 are controlled by signals T1, T2, T3, T4 from the circuit control unit 111. In the meantime, a voltage Viex that is to be generated at a resistance Ri serially connected to the excitation coil 102 indicates a value corresponding to the excitation current Iex, and is sampled at the sampling unit 108 and is then input to the controller 110.

Figure 3:
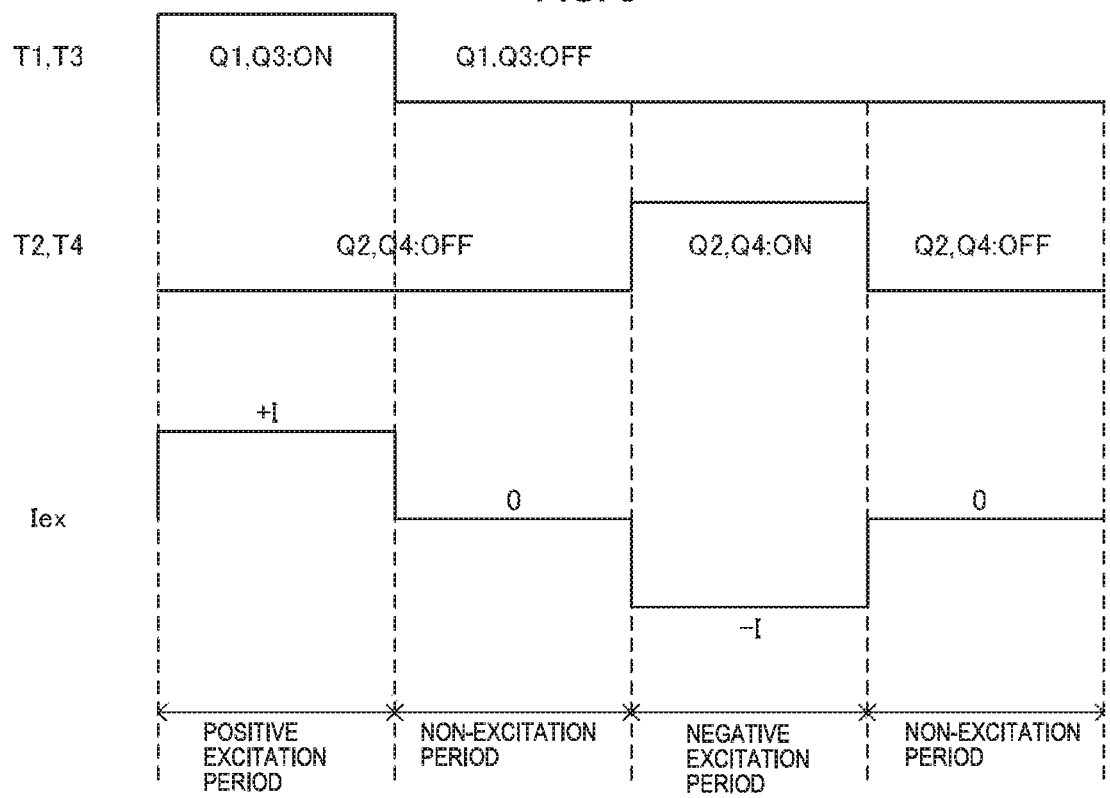
FIG. 3 depicts a waveform of excitation current.

As shown in FIG. 3, the circuit control unit 111 divides one cycle of excitation into four periods. The circuit control unit 111 outputs the signals T1, T3 so that the switching elements Q1, Q3 are on only for a first period, respectively, and outputs the signals T2, T4 so that the switching elements Q2, Q4 are on only for a third period, respectively. Thereby, the excitation current Iex repeats a cycle consisting of a positive excitation period, a non-excitation period, a negative excitation period and a non-excitation period.

Figure 4:
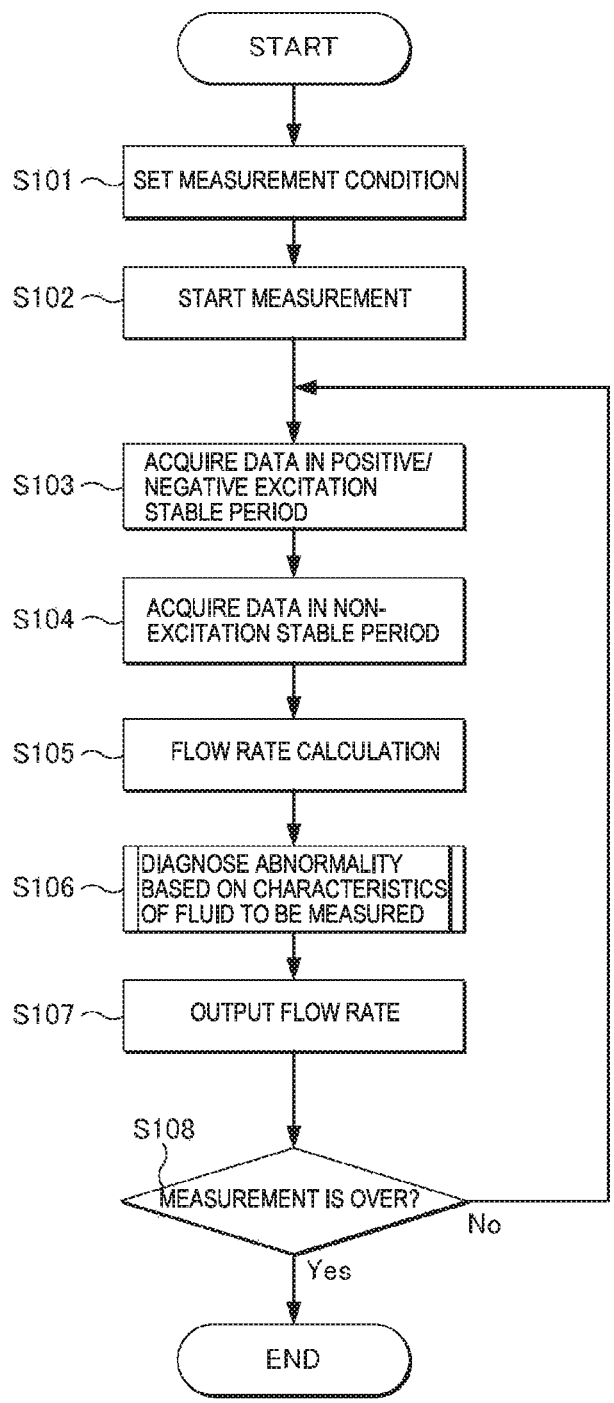
FIG. 4 is a flowchart depicting operations of the electromagnetic flowmeter according to the exemplary embodiment.

FIG. 4 is a flowchart depicting operations of the electromagnetic flowmeter 100 according to the exemplary embodiment. The electromagnetic flowmeter 100 can perform measurement of a flow rate of the fluid to be measured and detection processing of an abnormality based on characteristics of the fluid to be measured in parallel. First, before starting the measurement, a setting relating to measurement conditions is received from the user (S101). In the setting relating to measurement conditions, a parameter setting such as a flow rate span and a unit, for example, is received.

When the excitation current Iex is generated to start measurement of the flow rate of the fluid to be measured (S102), a detection signal Eez of a positive/negative excitation stable period is sampled (S103) and a detection signal Eez of a non-excitation stable period is also sampled (S104).

Figure 5:
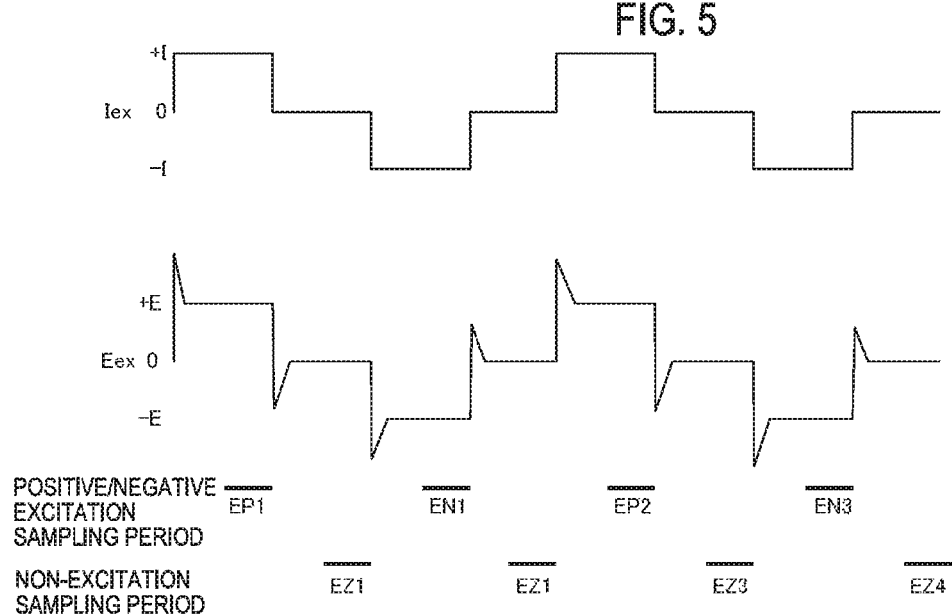
FIG. 5 depicts sampling periods for which a noise levels are to be acquired.

As shown in FIG. 5, the positive/negative excitation stable period is a period for which a differential noise converges and a waveform is stable in the positive excitation period and the negative excitation period. A sampling period EPn (positive excitation period) and a sampling period ENn (negative excitation period) are set for the positive/negative excitation stable period.

Also, the non-excitation stable period is a period for which a differential noise converges and a waveform is stable in the non-excitation period. A non-excitation sampling period EZn is set for the non-excitation stable period.

Figure 6:
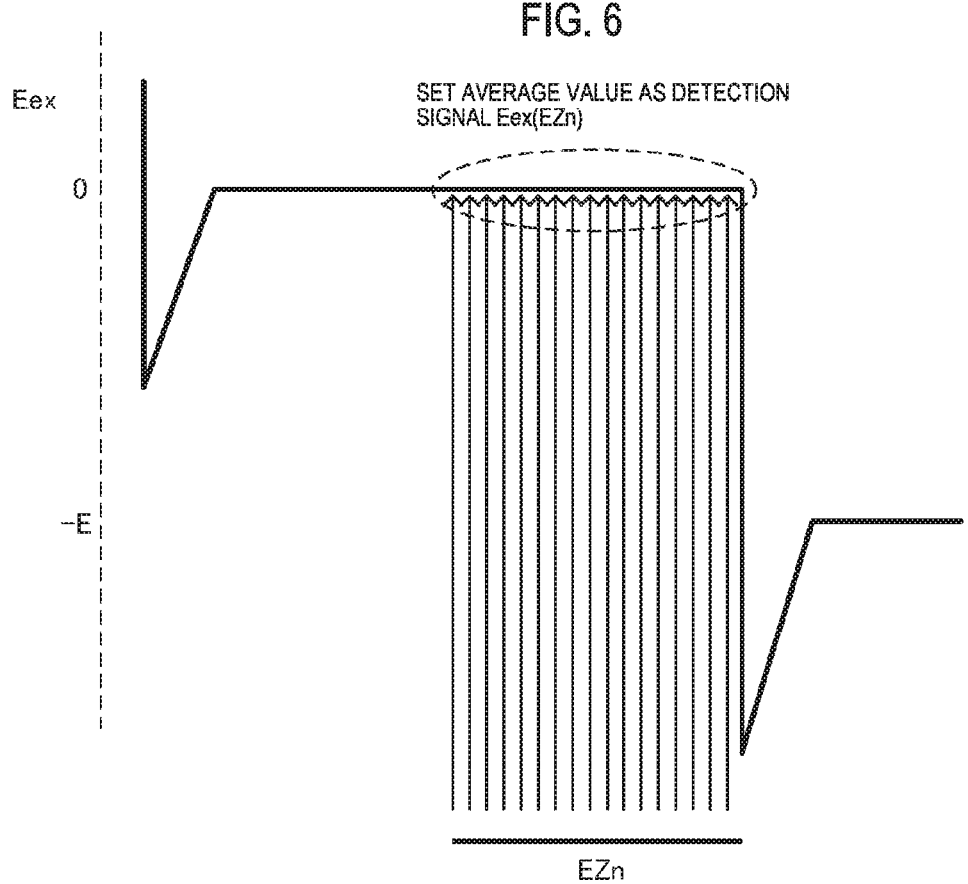
FIG. 6 depicts a sampling in the sampling period.

During the sampling period, the sample data is repeatedly acquired with a predetermined sampling rate, as shown in FIG. 6. An average value of the repeatedly acquired sample data is set as a detection signal of the corresponding period. In the exemplary embodiment, a noise level is detected on the basis of the detection signal Eex(EZn) acquired in the non-excitation sampling period EZn. Since a magnetic field is not applied to the fluid to be measured, an electromotive force proportional to the flow velocity is not generated. Therefore, the noise level in the corresponding period does not depend on the flow velocity.

The detection signal Eex(EZn), which is obtained in the non-excitation stable period, includes a noise, which is generated due to the variation of an electrode potential. As a cause of the noise, air bubble generation, a low conductivity, a slurry fluid, electrode corrosion, a change in fluid conductivity, attachment of insulating foreign matters to the electrode, and the like may be exemplified. That is, it is possible to detect an abnormality based on characteristics of the fluid to be measured by acquiring the noise level generated in the non-excitation stable period.

In the meantime, a spectrum of the noise generated due to the abnormality based on characteristics of the fluid to be measured has a characteristic that it decreases by 1/f with a corner frequency ranging from 10 Hz to several tens Hz. Therefore, it is preferably to exclude a direct current noise component and a long-period noise component from a detection target.

Returning to the description of the flowchart of FIG. 4, the calculation unit 112 of the controller 110 calculates a flow rate of the fluid to be measured, based on the detection signals acquired in the positive/negative excitation sampling periods (EPn, ENn) (S105). The calculation of the flow rate of the fluid to be measured is the same as the related art.

Also, the diagnosis unit 113 of the controller 110 diagnoses an abnormality based on characteristics of the fluid to be measured, on the basis of the detection signal Eex(EZn) acquired in the non-excitation sampling period EZn (S106). This processing will be described in detail later.

A measurement result of the flow rate calculated by the calculation unit 112 is output from the current output unit 133 and the like (S107). The electromagnetic flowmeter 100 repeats the above processing (S103 to S107) until the measurement is over (S108: Yes).

In the below, the abnormality diagnosis processing (S106) based on characteristics of the fluid to be measured is described in detail with reference to a flowchart of FIG. 7. In this processing, a noise level for abnormality diagnosis is calculated from the detection signal Eex(EZn) acquired in the non-excitation sampling period EZn for the non-excitation stable period (S201).

As a method of calculating the noise level for abnormality diagnosis, a variety of methods can be applied. For example, an absolute value of the detection signal in each non-excitation sampling period is calculated to calculate a noise level in each non-excitation sampling period and then, an average value of the noise levels in the plurality of continuous non-excitation sampling periods is calculated (damping calculation) so that the average value is set as a noise level for abnormality diagnosis. Alternatively, maximum values of noise levels in a plurality of continuous non-excitation sampling periods are extracted and an average value thereof is calculated so that the average value is set as a noise level for abnormality diagnosis.

Alternatively, calculation of a noise level for abnormality diagnosis in which a direct current noise component and a long-period noise component, which is sufficiently long with respect to an excitation period, are to be positively excluded may be performed. For example, for the detection signals Eex(EZ1), Eex(EZ2), Eex(EZ3), ... in the continuous non-excitation sampling periods EZ1, EZ2, EZ3, ..., weighted average calculation where a sum of coefficients such as $$Va1 = Eex(EZ1) - 2Eex(EZ2) + Eex(EZ3)$$
$$Va2 = -Eex(EZ2) + 2Eex(EX3) - Eex(EZ4)$$
$$Va3 = Eex(EZ3) - 2Eex(EZ4) + Eex(EZ5)$$
$$Va4 = -Eex(EZ4) + 2Eex(EZ5) - Eex(EZ6)$$
$$...$$

is zero (0) is performed, absolute values of the coefficients Van are calculated, and then an average value of a plurality of continuous coefficients Van, Va(n+1), ... is calculated (damping calculation) so that the average value is set as a noise level for abnormality diagnosis. In this example, the weighted average calculation where three coefficients (1, −2, 1) or (−1, 2, −1) of which a sum is zero (0) are multiplied is performed in the three continuous non-excitation sampling periods. Alternatively, maximum values of a plurality of continuous coefficients Van, Va(n+1), ... may be extracted and an average value thereof may be calculated so that the average value is set as a noise level for abnormality diagnosis.

According to the weighted average calculation (1−2−1 calculation), it is possible to remove the influences of a direct current noise 1, a gradual increase noise 2, a long-period noise 3, which is sufficiently long with respect to the excitation period, and the like, which are preferably put aside from the detection target, in the exemplary embodiment as shown in FIG. 8.

When the calculated noise level for abnormality diagnosis is equal to or greater than a predetermined reference value (S202: Yes), a warning is displayed on the display unit 131 or warning information and the like are output from the pulse output unit 134, the status output unit 135 and the like (S203). Thereby, the user can know that an abnormality based on characteristics of the fluid to be measured has occurred. Therefore, the user can take measures such as maintenance. However, a value of the calculated noise level for diagnosis may be output, irrespective of a value of the noise level for diagnosis.

Also, in the exemplary embodiment, when outputting the warning, a hint as to a cause of the abnormality may be provided to the user. When providing a hint as to a cause of the abnormality (S204), the cause is presumed in accordance with a predetermined determination standard (S205), and a message based on a presumption result is output from the display unit 131, the pulse output unit 134, the status output unit 135 and the like (S206).

For example, when it is determined by a measurement result of the conductivity measuring circuit 109 that the conductivity of the fluid to be measured is greater than a first predetermined reference value, the electrode corrosion, the solid matter slurry or the air bubble generation such as cavitation is considered as a cause of the abnormality that the noise level increases. In this case, for example, a message indicating that 'when the electrode is appropriately selected with respect to the fluid to be measured, there is a possibility that the fluid to be measured is solid matter slurry or the air bubbles such as cavitation have been generated' is output.

Also, a message indicating that 'in a case of slurry fluid, there is a possibility that a lining material has been damaged/worn' may be output. This message is made considering a case where when a lining material around the electrode is damaged/worn by the slurry fluid, a liquid contact area of the electrode increases to increase the noise level.

Also, when it is determined by a measurement result of the conductivity measuring circuit 109 that the conductivity of the fluid to be measured is less than a second predetermined reference value, a message indicating that 'when the fluid viscosity is low, there is a possibility that the conductivity to be measured is low' is output, for example.

Also, when the conductivity of the fluid to be measured is within a predetermined range, a message indicating that 'when the fluid to be measured is acidic/alkali, there is a possibility of the electrode corrosion' is output, for example.

In the above exemplary embodiment, the excitation current Iex of which the non-excitation period is provided between the positive excitation period and the negative excitation period is enabled to flow to the excitation coil 102. In recent years, the excitation current Iex having a two-frequency excitation waveform (FIG. 9C) in which a short-period pulse as shown in FIG. 9A and a long-period pulse as shown in FIG. 9B are overlapped is enabled to flow to the excitation coil 102. By using the excitation current Iex having the frequency excitation waveform, it is possible to stabilize a zero point and to improve the noise resistance and the high-speed responsiveness.

For example, as shown in FIG. 9C, when the excitation current Iex having, as one cycle, a waveform in which a combination of the positive excitation period and the non-excitation period is repeated six times and a combination of the negative excitation period and the non-excitation period is repeated six times is used, the non-excitation sampling period is each of the non-excitation stable periods EZ1 to EZ12, as shown in FIG. 9D.

At this time, the noise level for abnormality diagnosis can be calculated by calculating respective absolute values of the detection signals Eex(EZ1) to Eex(EZ12) in the non-excitation stable periods EZ1 to EZ12 to calculate the noise levels in the respective non-excitation sampling periods and calculating (damping calculation) an average value of the noise levels in the respective non-excitation sampling periods, for example.

Alternatively, by adopting the weighted average processing by the (1−2−1) calculation, $Va1=Eex(EZ1$ before two periods$)-2Eex(EZ1$ before one period$)+Eex(EZ1$ in the current period), $Va2=Eex(EZ2$ before two periods$)-2Eex(EZ2$ before one period$)+Eex(EZ2$ in the current period), ..., and $Va12=Eex(EZ12$ before two periods$)-2Eex(EZ12$ before one period$)+Eex(EZ12$ in the current period)

may be calculated, absolute values of Va1 to Va12 may be calculated, and then an average value of Va1 to Va12 may be calculated (damping calculation) so that the average value is set as a noise level for abnormality diagnosis.

As another example of the weighted average processing by the (1–2–1) calculation, $Va1=Eex(EZ1$ before one period$)-2Eex(EZ7$ in the current period$)+Eex(EZ1$ in the current period)

$Va2=Eex(EZ2$ before one period$)-2Eex(EZ8$ in the current period$)+Eex(EZ2$ in the current period)

$Va6=Eex(EZ6$ before one period$)-2Eex(EZ12$ in the current period$)+Eex(EZ6$ in the current period)

$Va7=-Eex(EZ7$ before one period$)+2Eex(EZ1$ before one period$)-Eex(EZ7$ in the current period)

$Va8=-Eex(EZ8$ before one period$)+2Eex(EZ2$ before one period$)-Eex(EZ8$ in the current period)

..., and $Va12=-Eex(EZ12$ before one period$)+2Eex(EZ6$ before one period$)-Eex(EZ12$ in the current period)

may be calculated, absolute values of Va1 to Va12 may be calculated, and then an average value of Va1 to Va12 may be calculated (damping calculation) so that the average value is set as a noise level for abnormality diagnosis.

Figure 10:
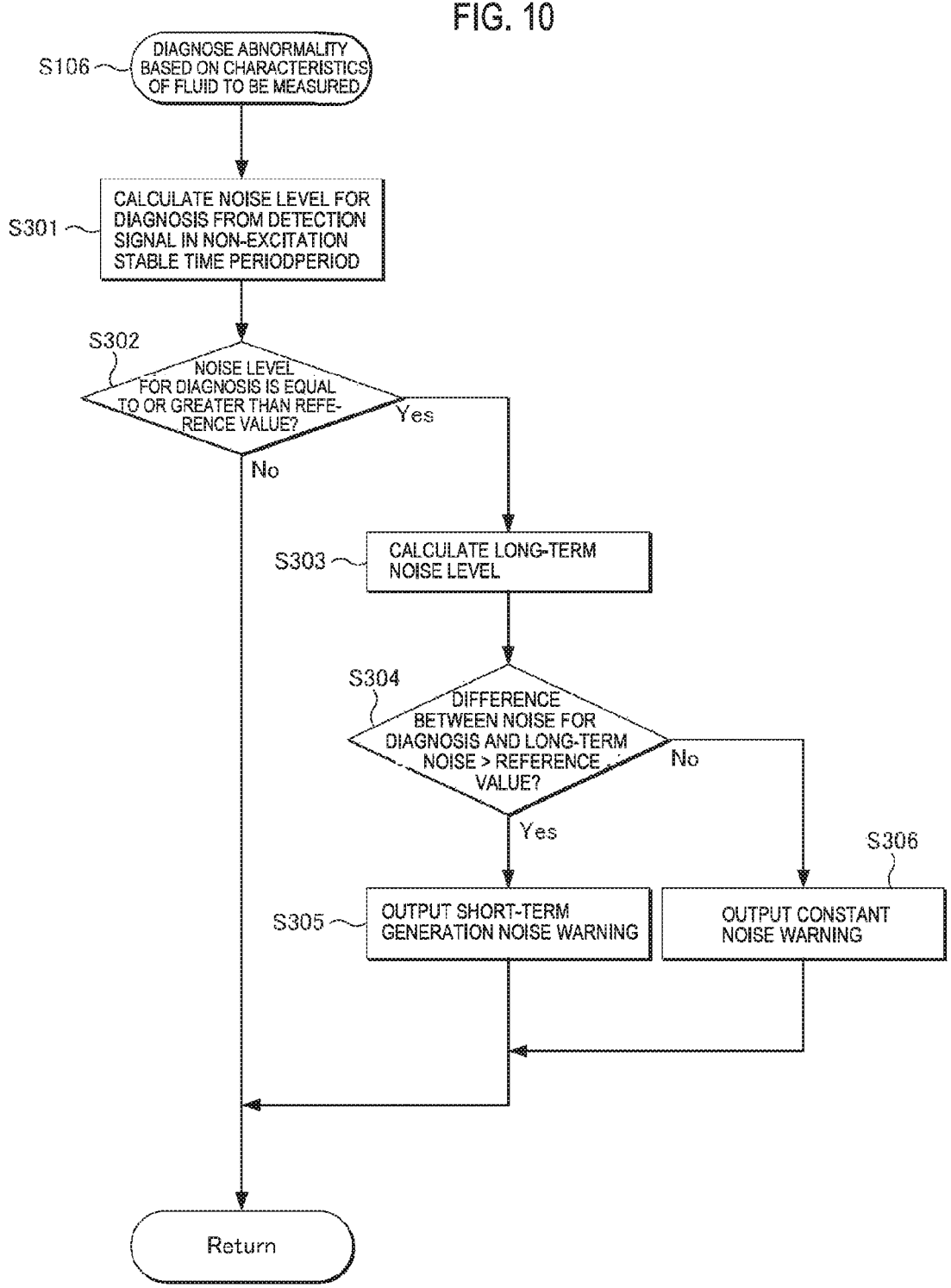
FIG. 10 is a flowchart depicting another example of the abnormality diagnosis processing based on characteristics of the fluid to be measured.

In the below, another example of the abnormality diagnosis processing (S106) based on characteristics of the fluid to be measured is described with reference to a flowchart of FIG. 10. Also in this example, a noise level for abnormality diagnosis is calculated from the detection signal Eex(EZn) acquired in the non-excitation sampling period EZn for the non-excitation stable period (S301).

The method of calculating a noise level for abnormality diagnosis may be the same as the above example. When the calculated noise level for abnormality diagnosis is equal to or greater than a predetermined reference value (S302: Yes), a long-term noise level is additionally calculated (S303).

Here, the long-term noise level is calculated using a longer damping time constant, in the average value calculation (damping calculation) upon the calculation of the noise level for abnormality diagnosis. For example, when the noise level for abnormality diagnosis is an average value of about 1 to 3 seconds, the long-term noise level is set as an average value of about several tens of seconds.

Here, in a case of a noise that is to occur constantly, a noise level for abnormality diagnosis calculated with a short damping time constant and a long-term noise level calculated with a long damping time constant have substantially the same value.

On the other hand, in a case of a short-term generation noise that is to occur sporadically, a noise level for abnormality diagnosis calculated with a short damping time constant and a long-term noise level calculated with a long damping time constant have different values. In the meantime, the short-term generation noise that is to occur sporadically may occur when broken pieces separated from a piping collide with the electrode, when the chemicals are mixed at an upstream side and the chemical potential of the electrode is thus changed, and the like, for example.

For this reason, when a difference between the noise for abnormality diagnosis and the long-term noise is equal to or greater than a reference value (S304: Yes), a warning indicating that the sporadic short-term generation noise has occurred is output (S305), and when a difference between the noise for abnormality diagnosis and the long-term noise is not equal to or greater than a reference value (S304: No), a warning indicating that the constant noise has occurred is output (S306). In the meantime, the determination as to the difference between the noise for abnormality diagnosis and the long-term noise in the processing of S304 may be made when a state of the same difference continues several times.

In the below, a second example of the abnormality diagnosis processing (S106) is described with reference to a flowchart of FIG. 11. In the second example, the low conductivity, the air bubbles and the corrosion are discriminated as the cause of the abnormality and a possibility of an electrical noise (for example, EMC noise) is considered, so that the precision of the cause hint upon the output of the abnormality diagnosis warning is further improved.

Also in the second example, a noise level for abnormality diagnosis is calculated from the detection signal Eex(EZn) acquired in the non-excitation sampling period EZn for the non-excitation stable period (S401). The method of calculating a noise level for abnormality diagnosis may be the same as the above examples.

Also, the diagnosis unit 113 acquires a flow velocity of the fluid to be measured, which is calculated in the flow rate calculation by the calculation unit 112 (S402). That is, in the second example, the fluid flow velocity is used for cause presumption of the abnormality.

The diagnosis unit 113 preserves the calculated noise level for abnormality diagnosis and the acquired flow velocity, as history (S403). The preservation is made in a buffer area formed on a memory of the controller 110, for example. The history has only to be temporarily preserved so as to presume a cause of the abnormality. Here, for example, the history is kept for 60 seconds by using a ring buffer.

Then, it is determined whether the noise level for diagnosis satisfies a predetermined warning condition (S404). The predetermined warning condition can be arbitrarily set. However, here, a warning condition is that 10% or greater of the noise level for diagnosis recorded in the ring buffer as the history is greater than a predetermined reference value, for example. In the meantime, the condition of 10% or greater is to stabilize the warning determination and can be appropriately adjusted. For example, when the condition is set to a value smaller than 10%, it is possible to increase the sensitivity of the warning determination. Alternatively, the warning condition may be set on the basis of the average value, the variation tendency and the like of the noise level for diagnosis.

When it is determined that the warning condition is not satisfied (S404: No), a warning is not output (S405). That is, when the warning is being output, the warning state is released, and when the warning is not output, the non-warning state is kept.

On the other hand, when the warning condition is satisfied (S404: Yes), a warning is output (S406). The warning output can be made by displaying a warning on the display unit 131 or outputting the warning information and the like from the pulse output unit 134, the status output unit 135 and the like.

Then, a hint as to a cause of the abnormality is provided. When providing the hint as to a cause of the abnormality, it is first determined whether there is a correlation between a variation in the noise level for diagnosis and a variation in the flow velocity by referring to the history of the noise level for diagnosis and the history of the fluid flow velocity (S407).

In the second example, the hint as to a cause of the abnormality is focused on the relation between the noise level for diagnosis and the fluid flow velocity, and is based on characteristics to be described below.

1) In the low conductivity fluid of which conductivity is constant, the noise level for diagnosis increases as the flow velocity increases.

2) In the fluid having a property of corroding the electrode material, the higher the flow velocity of the fluid passing an electrode surface, the corrosion progresses, so that the noise level for diagnosis increases.

3) In the fluid of which an air bubble/fluid volume ratio is constant, the noise level for diagnosis decreases as the flow velocity increases.

4) EMC (Electro-Magnetic Compatibility) is influenced by installation location application factors such as a conductive noise, a radiation electromagnetic field noise and the like, which do not depend on the flow rate measurement, and is irrelative to the correlation between the flow velocity and the noise level for diagnosis.

Figure 12A:
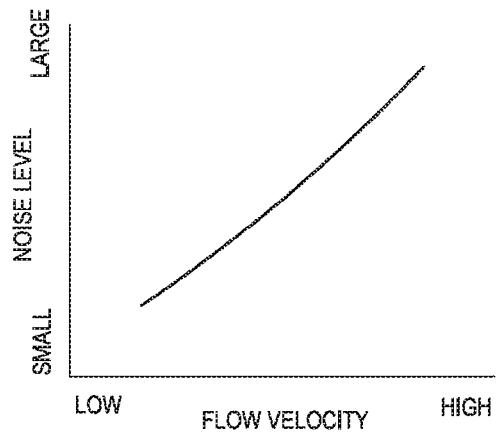
FIGS. 12A and 12B depict a correlation between a noise level and a flow velocity.
Figure 12B:
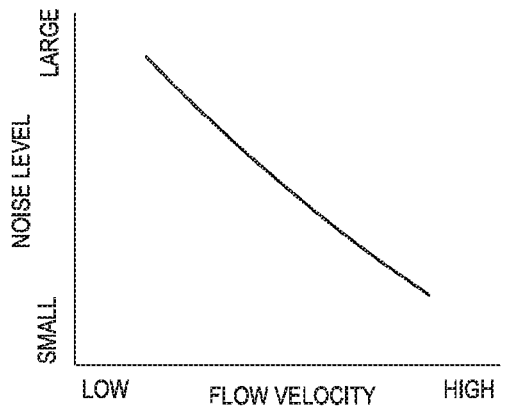

For this reason, in the case of the abnormality of which causes are 1) the low conductivity fluid and 2) the electrode corrosion, a relation between the noise level for diagnosis and the fluid flow velocity is a positive correlation as shown in FIG. 12A. Also, in the case of the abnormality of which cause is 3) the air bubbles, a relation between the noise level for diagnosis and the fluid flow velocity is a negative correlation as shown in FIG. 12B. Also, in the case of the abnormality of which cause is 4) the EMC, there is no correlation between the noise level for diagnosis and the fluid flow velocity.

From the above, in the processing of providing a hint as to a cause of the abnormality of the second example, it is determined whether there is the correlation between the variation in the noise level for diagnosis and the variation in the flow velocity by referring to the history of the noise level for diagnosis and the history of the fluid flow velocity.

Returning to the description of the flowchart of FIG. 11, when it is determined that there is the correlation between the variation in the noise level for diagnosis and the variation in the flow velocity (S407: Yes) and the correlation is a positive correlation (S409: Yes), it is presumed that the cause of the abnormality is one of the low conductivity fluid and the electrode corrosion.

Therefore, when it is determined by the conductivity measurement result of the conductivity measuring circuit 109 that the fluid to be measured is a high conductivity fluid (S410: Yes), a hint indicating that the cause of the abnormality is the electrode corrosion is provided (S411), and when it is determined that the fluid to be measured is not a high conductivity fluid (S410: No), a hint indicating that the cause of the abnormality is the low conductivity fluid is provided (S412). The determination as to whether the fluid to be measured is a high conductivity fluid may be made by determining whether the conductivity of the fluid to be measured is equal to or greater than a predetermined reference value, for example, 2000 µS/cm. In the meantime, in a case of an electromagnetic flowmeter for which the conductivity measuring circuit 109 is not provided, a hint indicating that the cause of the abnormality is the electrode corrosion or the low conductivity fluid may be provided.

On the other hand, when it is determined that there is the correlation between the variation in the noise level for diagnosis and the variation in the flow velocity (S407: Yes) and the correlation is a negative correlation (S409: No), a hint indicating that the cause of the abnormality is the air bubbles is provided (S413).

Also, when it is determined that there is no correlation between the variation in the noise level for diagnosis and the variation in the flow velocity (S407: No), a hint indicating that the cause of the abnormality is the electrical noise (for example, a conductive noise and a radiation electromagnetic field noise of the EMC noise) is provided (S408).

In the second example, the history of the noise level for diagnosis and the history of the flow velocity are recorded. Thereby, it is possible to perceive the long-term variation relation between the noise level for diagnosis and the flow velocity.

Figure 13A:
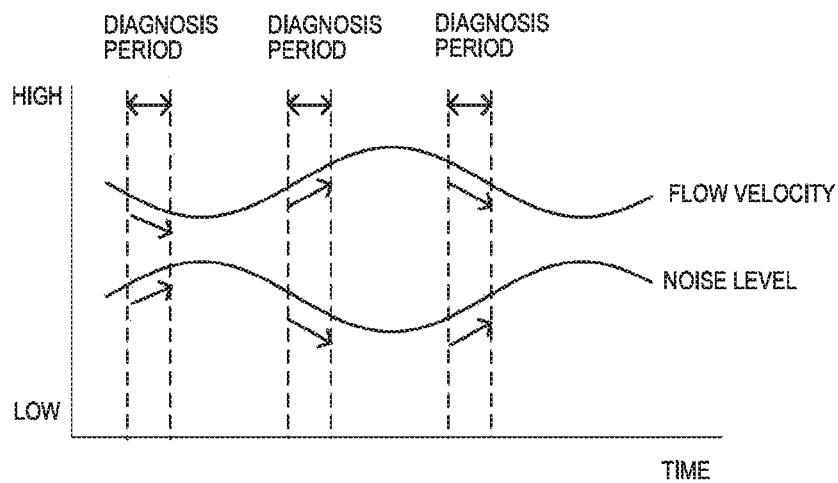
FIGS. 13A and 13B depict temporal changes of the noise level and the flow velocity.
Figure 13B:
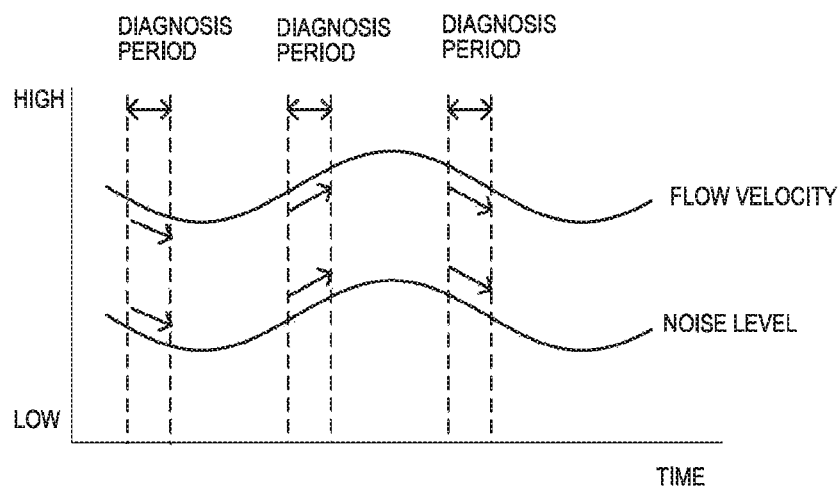
Figure 14:
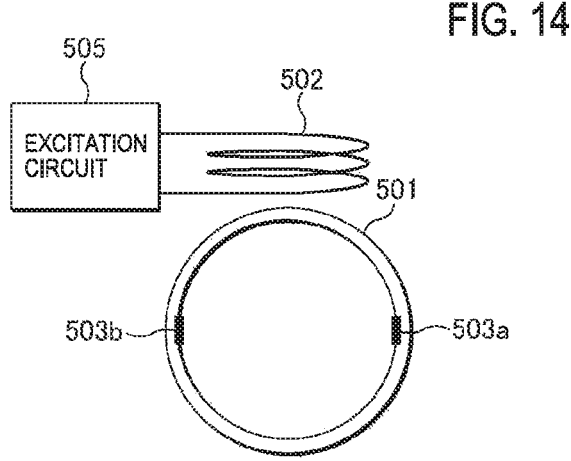
FIG. 14 depicts flow rate measurement by the electromagnetic flowmeter.
Figure 15:
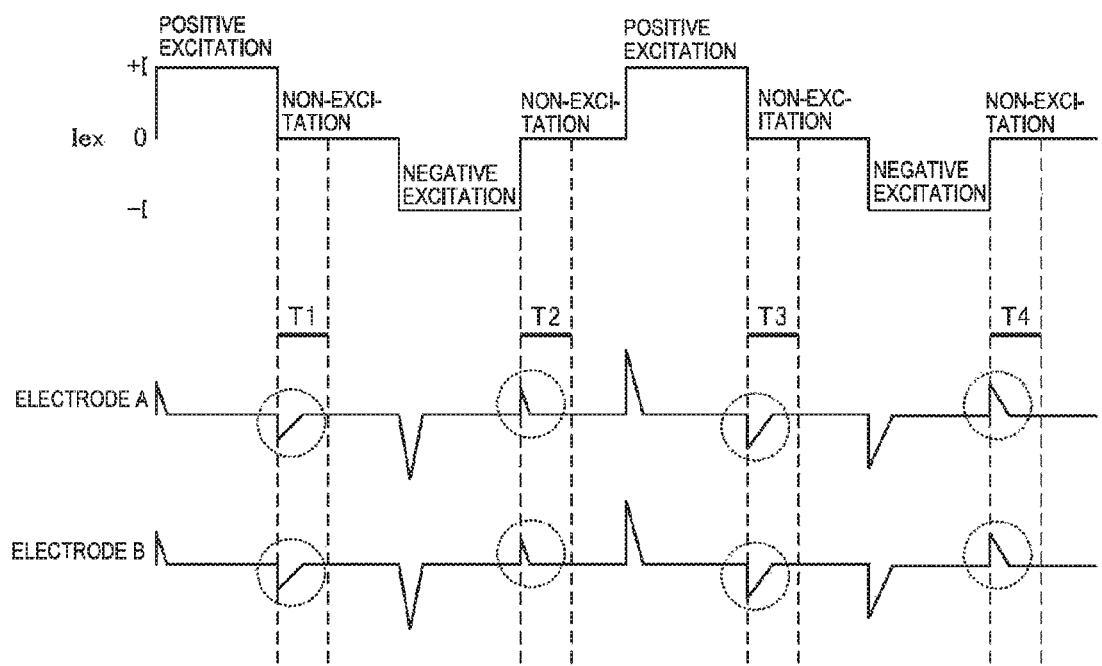
FIG. 15 depicts excitation current including a non-excitation period, and an electromotive force.

In the actual fields, the flow velocity of the process fluid is not constant all the time but is frequently varied in many cases. Also in this case, as shown in FIG. 13, since it is possible to check the correlation between the variation in the flow velocity and the variation in the noise level for diagnosis several times (three times, in examples of FIGS. 13A and 13B, respectively), the determination as to the correlation is correct, so that it is possible to improve the precision of the cause hint upon the output of the abnormality diagnosis warning.

What is claimed is:

1. An electromagnetic flowmeter configured to apply a magnetic field, which is generated by excitation current, to a fluid to be measured flowing in a measurement tube, and to measure a flow rate of the fluid to be measured on the basis of a detection signal to be generated from an electrode provided in the measurement tube, the electromagnetic flowmeter comprising:
    an excitation circuit configured to generate the excitation current having a positive excitation period, a negative excitation period and a non-excitation period; and
    a diagnosis unit configured to detect an abnormality based on characteristics of the fluid to be measured, on the basis of a level of the detection signal in a non-excitation stable period, which is a period in which a differential noise of detection signal to be generated in the non-excitation period converges.

2. The electromagnetic flowmeter according to claim 1, wherein the diagnosis unit is configured to set a value, which is to be obtained by averaging absolute values of the detection signals or averaging peak values of the detection signals in continuous non-excitation stable periods, as the level of the detection signal.

3. The electromagnetic flowmeter according to claim 1, wherein the diagnosis unit is configured to determine that the abnormality based on characteristics of the fluid to be measured has occurred, when the level of the detection signal is equal to or greater than a predetermined reference value.

4. The electromagnetic flowmeter according to claim 3, wherein the diagnosis unit is configured to provide a hint as to a cause of the abnormality in accordance with a predetermined standard, when it is determined that the abnormality based on characteristics of the fluid to be measured has occurred.

5. The electromagnetic flowmeter according to claim 4, further comprising:

a conductivity measuring circuit configured to measure a conductivity of the fluid to be measured, wherein the diagnosis unit is configured to provide the hint as to a cause of the abnormality by using the conductivity measured with the conductivity measuring circuit.

6. The electromagnetic flowmeter according to claim 1, wherein the excitation circuit is configured to generate the excitation current having a two-frequency excitation waveform in which a short-period pulse and a long-period pulse are overlapped.

7. The electromagnetic flowmeter according to claim 1, wherein the diagnosis unit is configured to set a value, which is to be obtained by calculating a weighted average where a sum of coefficients becomes zero (0) for the detection signals in continuous non-excitation stable periods, as the level of the detection signal.

8. The electromagnetic flowmeter according to claim 7, wherein in the weighted average where a sum of coefficients becomes zero (0), coefficients (1, −2, 1) or (−1, 2, −1) are used for the detection signals in the three continuous non-excitation stable periods.

9. The electromagnetic flowmeter according to claim 2, wherein the diagnosis unit is configured to further average the detection signals in a period longer than a period that is to be used for averaging upon calculation of the level of the detection signal and to determine whether the abnormality is constant or sporadic on the basis of a difference of two average values.

10. The electromagnetic flowmeter according to claim 1, wherein the abnormality based on characteristics of the fluid to be measured, which is to be detected by the diagnosis unit, comprises any one of air bubble generation, a low conductivity, a slurry fluid, electrode corrosion by the fluid to be measured, and attachment of insulating foreign matters to the electrode.

11. The electromagnetic flowmeter according to claim 4, wherein the diagnosis unit is configured to provide the hint as to the cause of the abnormality by determining a correlation between variation in a flow velocity, which is to be obtained upon measurement of the flow rate of the fluid to be measured, and variation in the level of the detection signal.

12. The electromagnetic flowmeter according to claim 11, wherein the diagnosis unit is configured to provide a hint indicating that the cause of the abnormality is a low conductivity or electrode corrosion, when it is determined that the correlation between the variation in the flow velocity and the variation in the level of the detection signal is a positive correlation.

13. The electromagnetic flowmeter according to claim 11, wherein the diagnosis unit is configured to provide a hint indicating that the cause of the abnormality is air bubbles, when it is determined that the correlation between the variation in the flow velocity and the variation in the level of the detection signal is a negative correlation.

14. The electromagnetic flowmeter according to claim 11, wherein the diagnosis unit is configured to provide a hint indicating that the cause of the abnormality is an electrical noise, when it is determined that there is no correlation between the variation in the flow velocity and the variation in the level of the detection signal.

* * * * *